United States Patent Office 3,269,975
Patented August 30, 1966

3,269,975
TETRACARBOXYLIC ACID HARDENERS FOR EPOXY RESINS AND POWDERED EPOXY RESIN COMPOSITIONS INCLUDING SUCH HARDENERS
Max M. Lee, Fort Wayne, Ind., assignor to Hysol Corporation, Olean, N.Y., a corporation of New York
No Drawing. Filed July 9, 1963, Ser. No. 293,901
10 Claims. (Cl. 260—37)

This invention relates to normally stable thermosetting resinous coating compositions in the form of a finely divided, fusible, solid and a method for the production of such a coating. More particularly, this invention relates to novel solid friable, non-agglomerable hardeners for epoxy resins and to thermosetting epoxy resin compositions containing such hardeners in the form of free-flowing powders which remain stable to storage for long periods of time and yet fuse and cure rapidly to tough, durable and flexible coatings at moderately elevated temperatures.

The technique of coating heated articles, such as those of metal, by dipping them or tumbling them in a suspended or static bed of resinous coating powder or by spraying or sprinkling coating powder thereon, is well known and is readily utilized for coating articles of diverse shapes. Particularly effective in coating articles of irregular and undercut contour is the so-called "fluidized bed" process. In this process a clean, preheated article is dipped for a short period of time into a fusible plastic powder which is maintained in a fluidized state by an ascending current of gas passing through it. On striking the hot article, the powder fuses and clings to its surface. After withdrawal from the fluidized bed, the clinging particles may melt and coalesce and cure into a smooth, continuous coating by the action of the residual heat of the article, or alternatively, such cure may require supplemental heating in an oven. The powdered plastic, while in the fluidized state, behaves like a boiling liquid. It offers little resistance to immersion, seeks small openings and readily coats all surfaces with which it comes into contact. Coatings applied by this fusion process offer several distinct advantages over conventional coating methods. Thick, non-sag coatings up to 50 to 60 mils thick can be applied by this process in one application, whereas coatings only a few mils thick can be applied from conventional solvent solutions. This process also avoids the use of volatile solvents and the attendent costs and hazards caused by the solvent.

The formulation of fusible powdered coating compositions for application by the fluidized bed process introduces requirements for film-forming materials which are unlike those heretofore encountered in the formulation of conventional coatings and which are new in the protective coating industry. The film-forming material must be a solid which is capable of fusing at an elevated temperature below that at which it chars or otherwise decomposes to any substantial degree. The material must be friable and capable of reduction to a free-flowing powder of very small particle size. Furthermore, the powder must be capable of retaining its free-flowing powder form during storage without agglomeration or cold-flow. Thermosetting resins often require a curing agent or hardener in the formulation in order to convert the fusible resin to an infusible, cross-linked polymer. Many otherwise desirable hardeners are restricted in their use in fluidized bed powder formulations because they are too reactive with the epoxy resin, thus limiting their usable shelf-life. Other hardeners are restricted in their use because they are liquids or low-melting agglomerable solids. Still other hardeners for epoxy resins cannot be used in fluidized bed powder formulations because they readily react with moisture during storage resulting in slow reacting, partially fusible powders that yield rough uneven coatings when applied by the fluidized bed process. Still other hardeners are not satisfactory for fluidized bed powder formulations because on curing they yield coatings of a brittle nature having poor impact resistance and cannot be flexed without cracking.

From the above, it will be evident that there is a definite need for a free-flowing powdered fusible epoxy resin composition which is stable in storage and which can be heat cured to an infusible, insoluble state that is characterized by good impact resistance and flexibility.

A principal object of this invention is to provide a series of solid, friable, non-agglomerable hardeners or curing agents for epoxy resins that are insensitive to moisture and show little reactivity during storage.

Another object of this invention is to provide a series of hardeners especially adapted to fluidized bed powder compositions that convert epoxy resin admixed therein to tough, durable and flexible coatings.

Another object of this invention is to provide a free-flowing fusible powdered resinous composition which readily converts to the infusible, insoluble state to produce durable coatings which are adherent to metal substrates.

Another object of this invention is to provide a method for the production of free-flowing powdered resin compositions which are suitable for application by the fluidized bed immersion process or by a spraying process.

Still another object is to provide a method for the coating of an article with an epoxy resin film which is tough, flexible, adherent, infusible and which has excellent water and chemical resistance. Still other objects and advantages will be apparent from the following description of the invention.

The novel hardening agents according to the present invention are reaction products of trimellitic anhydride

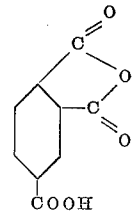

and a dihydric alcohol selected from the group consisting of diethylene to pentaethylene glycols, dipropylene and tripropylene glycols, and $C_5$ to $C_8$ alkane $\alpha,\omega$ diols. Preferred dihydric alcohols within this group include diethylene glycol, triethylene glycol, tetraethylene glycol, dipropylene glycol, and 1,6 hexane diol. Two mols of trimellitic anhydride react with one mol of the dihydric alcohol to form products which can be represented by the formula:

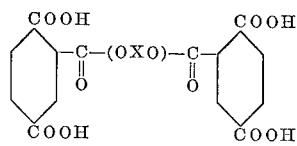

where the group —OXO— is a

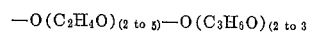

$$-O(C_2H_4O)_{(2 \text{ to } 5)} - O(C_3H_6O)_{(2 \text{ to } 3)}$$

or $C_5$ to $C_8$ alkyl dioxy radical.

The reaction is a simple addition or condensation effected by slow heating of the two components to a point beyond complete fusion, as for example, by heating over a one-half hour period to a temperature of the order of 190 to 220° C. The reaction product is then cooled to about 160° C. and poured into shallow receptacles to solidify. The solid, after cooling is broken into small pieces and ground, suitably in a micro-pulverizer, to a finely divided powder, preferably of a size such that 95% will pass through a 100 mesh standard sieve.

The powdered hardeners are very stable in storage, even in humid atmospheres, and are non-reactive with epoxy resins at normal room temperatures, permitting storage of mixed powders for many months without deterioration. Thus, they are particularly suited for use in dry powdered formulations of epoxy resin, together with appropriate fillers, pigments, etc. for application to heated articles by fluidized bed, dry spray, or flame spraying techniques.

While the new hardeners thus are advantageous for use with epoxy resins generally, there is special advantage to the use of these relatively long chain hardners with long chain epoxy resins to produce coatings of unusual toughness and flexibility. This is of particular importance when coating articles intended for reforming, or subjected to deforming or flexing after being coated.

Typical epoxy resins utilized in my invention are those produced by the reaction of one or more mols of epichlorohydrin or glycerol dichlorohydrin with a mol of a dihydric phenl compound, such as bisphenol A in the presence of a base such as sodium hydroxide and at elevated temperatures within the approximate range of 50° to 150° C. The solid glycidyl polyether obtained from epichclorohydrin and bisphenol A is a complex mixture rather than a single chemical compound which has been represented by the general formula:

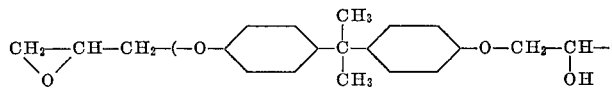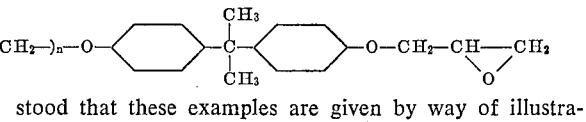

Preferred resins for use in the present invention are those in which $n$ has an average value varying from about 2 to about 8; and a number of such resins are commercially available. Expressed in other terms, the preferred resins are those having a molecular weight within the range of about 860 to 2550, and a melting point over 65° C. and suitably within the range of about 65 to 130° C. Although the solid reaction products from epichlorohydrin with bisphenol A are most commonly employed in my invention, the reaction products of epichlorohydrin with other dihydric phenols, such as for example resorcinol (1,3 benzenediol) may also be used as long as the reaction products are solid, friable epoxides having an epoxide equivalent greater than 1.0 and melting point above about 65° C.

In preparing powdered resin composition containing the new hardeners, the proportions are preferably within the range of about 0.1 to 0.35 part of hardener per part by weight of resin. When transparent coatings are desired, the composition may contain only the resin and hardener, together with a small amount of flow control agent, such as colloidal silica (about .005 to .025 part per part by weight of resin). The colloidal silica prevents sag and improves edge and corner coverage of the fused coating prior to its gelation during cure, and is also useful for this purpose in compositions which may contain filler and/or pigment.

It is frequently desirable to provide opacity and/or color in the coating by the addition of filler components including pigments and/or inert mineral fillers. Such filler components should suitably be of a particle size less than 325 mesh and can include any conventional pigments and mineral fillers which are compatible with the epoxy resin and hardener and stable to temperatures of 200–225° C. for at least one hour to provide for normal curing conditions. Typical pigments which can be employed are phthalocyanine blues and greens, mercury-cadmium and iron oxide reds and titanium dioxide white. Typical inert mineral fillers which can be employed include mica, silica, silicates, talcs, barytes, and the like.

The amount of filler components included in a powdered resin composition can vary considerably, depending upon the properties desired in coatings formed therewith. Where maximum flexibility is desired which will permit bending and deforming of coated articles without rupture of the coating, the quantity of filler components should be kept at the minimum required to provide opacity and/or color. Impact resistance will be decreased as the amount of filler components is increased, but with any particular concentration of filler components, i.e. 25% or even higher, compositions made with the new hardeners of the present invention have greater impact resistance than corresponding compositions made with conventional hardeners.

In formulating the new compositions, the several components can simply be mixed together and dry blended to a uniform powder as for example by blending in a ball mill. The resin and hardener components should have an initial particle size less than 40 mesh.

When filler components are employed, an alternate procedure is to melt the resin, add the filler components with mixing to provide a uniform blend, cool this blend to a solid which is then broken up and ground to less than 40 mesh, and then dry blend this powder with the hardener and colloidal silica. This procedure, by first wetting or coating particles of filler components with resin, leads to smoother and more homogeneous coatings.

The following examples will serve to illustrate the preparation of typical trimellitic anhydride-polyhydric alcohol reaction products, as well as powdered resin compositions, including these hardeners, but it is to be understood that these examples are given by way of illustration and not of limitation.

EXAMPLE I

Trimellitic anhydride in a fine powder or flake form was mixed with tetraethylene glycol in a mol ratio of 2:1 and gradually heated to a temperature of 195° C. in 30 minutes, then held for a period of about five minutes. The esterification reaction proceeded smoothly with some noticeable exotherm, resulting in a clear liquid at temperatures above 150–160° C. The reaction product was allowed to cool to about 160° C. then poured into a shallow dish to solidify rapidly. The solidified hardener on reaching room temperature was broken into small pieces, then brought to a particle size of which 95% passed through a 100 mesh screen by passing through a micropulverizer. The powder had a melting point in the range of 135–150° C.

EXAMPLE II

Finely powdered or flake trimellitic anhydride was mixed with triethylene glycol in a mol ratio of 2:1 and gradually heated to a temperature of 200° C. within twenty minutes, held for five minutes then let cool gradually to 165° C. before casting in a shallow dish. The resulting hardener was a friable solid having a melting point range of 150–165° C. The reaction product was micropulverized so that 95% of it could pass through a 100 mesh screen.

EXAMPLE III

Two hundred parts of trimellitic anhydride was added to one hundred parts of a mixture of polyethylene glycols, having an average molecular weight of 200 and commercially available as "Carbowax-200." The mixture was heated with stirring to a temperature of 210° C. in 30 minutes, then allowed to cool gradually until a temperature of 165° C. was reached, and then was poured into a shallow tray to solidify. The resulting hardener was finally powdered by means of a micropulverizer to a particle size such that 95% passes through a 100 mesh screen.

Similar solid hardeners are obtained by employing, in place of the polyethylene glycol in the foregoing procedure, dipropylene glycol, tripropylene glycol, or a $C_5$ to $C_8$ alkane $\alpha,\omega$ diol such as 1,6 hexanediol, in the proportion of one-half mol per mol of trimellitic anhydride.

EXAMPLE IV

One hundred parts of an epoxy resin formed by the reaction of bisphenol A with epichlorohydrin and characterized by an epoxy equivalent (grams of resin containing one gram equivalent of epoxide) within the range of 1600 to 2000, a melting point of 127° C. to 133° C. and a particle size less than 40 mesh, sixteen parts of a reaction product of two mols of trimellitic anhydride and one mol of tetraethylene glycol as described in Example 1 and characterized by a softening point of 135° C. to 150° C. and a particle size finer than 40 mesh, two parts by weight of a colloidal silica having a particle size less than one micron and one gram of an iron oxide pigment of a particle size less than 80 mesh were dry blended together. A series of steel bars, one inch by 4 inches by .060 inch thick were cleaned with steel wool and degreased with a solvent, were heated to a temperature of 200° C. and while at that temperature immersed in a fluidized-bed, formed using the above mixture, for periods of time ranging from one second to six seconds. After removal from the fluidized bed, the coated steel bars were maintained at a temperature of 200° C. for a period up to one hour to cure the coatings which had been deposited thereon during their immersion in the fluidized-bed. Upon cooling, the opaque coatings on the steel bars were smooth and uniform and were found to vary in thickness from 5 to 15 mils, the thicker coatings were produced by the longer time of immersion. A 10 mil coating on a steel bar 0.060 inch thick and cured for 30 minutes at 200° C. did not fracture when the coated steel bar was bent over a ½ inch steel mandrel at room temperature.

A quantity of this powdered, uncured composition was stored for a period of 10 months in a closed container at ambient conditions of room temperature. Steel bars identical to those described in Example IV were coated and cured in a similar manner. The resulting coatings were smooth, uniform and had approximately the same thickness and flexibility as the coatings obtained with the freshly made powder, indicating excellent storage stability for the composition.

EXAMPLE V

Two hundred parts of an epoxy resin described by Example IV, twenty four and one-half parts of a reaction product of trimellitic anhydride and triethylene glycol described in Example II and having a particle size of 80 mesh or less, two parts of a colloidal silica having a particle size less than one micron were dry blended together. A series of steel bars identical to those described in Example IV were heated to 200° C. and immersed in a fluidized bed comprising the above dry blended powder for periods of time varying from one-half second to five seconds then maintained at a temperature of 200° C. for thirty minutes. After cooling, the coatings deposited on the steel bars were transparent and varied in thickness from four to twelve mils. The coatings did not fracture when bent over a ½ inch steel mandrel at room temperature.

EXAMPLE VI

One hundred parts of an epoxy resin described by Example IV, twenty parts of a reaction product of trimellitic anhydride and tetraethylene glycol described in Example I, two parts of a colloidal silica having a particle size less than one micron and two parts of a titanium dioxide pigment having a particle size less than 100 mesh were dry blended together. The blended powder was spread to a depth of one-half inch in a tray and exposed to ambient conditions of temperature and humidity for a period of thirty days. Steel bars identical to those described in Example IV were heated to 200° C. and immersed for 3 seconds in a fluidized-bed of this exposed powder and then maintained at a temperature of 200° C. for thirty minutes. After cooling, the coatings were smooth, continuous, and opaque with an average thickness of 9 mils, and were similar in appearance and properties to coatings made with fresh, unexposed powder, indicating that the dry blended powder was not affected by exposure to normal humidity conditions.

EXAMPLE VII

One hundred parts of an epoxy resin formed by the reaction product of bisphenol A with epichlorohydrin and characterized by a weight per epoxide (grams of resin containing one gram equivalent of epoxide) within the range of 860 to 1015, a melting point of 95° to 105° C. and a particle size less than 40 mesh, thirty-two parts of the reaction product of two mols trimellitic anhydride and one mol of tetraethylene glycol as described in Example I, 2.5 parts of a colloidal silica of a particle size less than one micron and two parts of a titanium dioxide pigment of a particle size less than 100 mesh were dry blended together. Steel bars as described in Example IV were coated by immersing the bars preheated at 180° C. in a fluidized bed of the blended composition for one to six seconds, then followed by further heating at 180° C. for one hour. Upon cooling, smooth uniform opaque coatings varying from 6 to 20 mils thick were produced by the coating process. An 8 mil coating on a steel bar 60 mils thick bent over a one-half inch mandrel did not fracture at room temperature.

EXAMPLE VIII

One hundred parts of an epoxy resin described by Example IV was melted to a fluid liquid by heating to 150° C. to 160° C. Fifty parts of a dry finely divided silica having a particle size of 325 mesh or finer, one part of a finely powdered titanium dioxide pigment and one-quarter part of phthalocyanine green pigment dispersed in a liquid epoxy resin were added to good mechanical stirring while maintaining the temperature at 150° C. to 160° C. The mixture was then cast into a shallow tray to cool to room temperature. The solid resin was broken into small pieces then passed through a micropulverizer to obtain a particle size of 40 mesh or finer. One hundred and fifty parts of the powder of the composition as described were dry blended together with eighteen parts of the reaction product of trimellitic anhydride and tetraethylene glycol as described in Example I and one-half part of a colloidal silica having a particle size less than one micron. Steel bars as described in Example IV were preheated to 200° C. and immersed at that temperature in a fluidized bed comprised of the dry blended powder, then maintained at a temperature of 200° C. for thirty minutes. On cooling to room temperature, smooth uniform coatings of good impact resistance were obtained.

In any of Examples IV to VIII similar powdered resin compositions can be prepared utilizing in place of the stated hardener one of the other hardeners as described in Example III. When coating articles with such modified compositions, the optimum degree of preheating of such articles may differ from one composition to another for the same type article, but this optimum temperature is also influenced by the bulk and heat retaining capacity of the article to be coated as well as the thickness of coating desired. Similarly the extent of oven heating if any, which will be necessary to cure a coating will be influenced by the bulk and heat capacity of the article.

For dry spray and fluidized bed use, the powdered resin compositions may have particles distributed within the range of 5 to 600 microns, although somewhat smoother coatings are obtained if the maximum particle size is kept below about 400 microns.

I claim:

1. A resin composition for producing coatings of enhanced toughness and flexibility, said composition being in the form of a free flowing powder adapted for fluidized bed and dry spray application to heated objects to coat such objects, said powder having a particle size primarily within the range of 5 to 400 microns and comprising a mixture of particles of a fusible solid reaction product of epichlorohydrin with dihydric phenol having an epoxide equivalent greater than 1.0, and having a melting point within the range of about 65–130° C. and particles of a hardener in the proportions of about 0.1 to 0.35 part of hardener per part by weight of resin, said hardener consisting of the solid tetracarboxylic reaction product of two mols of trimellitic anhydride and one mol of a dihydric alcohol selected from the group consisting of diethylene to pentaethylene glycols, dipropylene to tripropylene glycols, and $C_5$ to $C_8$ alkane diols.

2. A resin composition as defined in claim 1 wherein said composition contains as a flow control agent, colloidal silica in the amount of about .005 to .025 part per part by weight of resin.

3. A resin composition as defined in claim 1 wherein said composition includes filler components selected from the group consisting of inert mineral fillers, pigments and mixtures thereof.

4. A resin composition as defined in claim 3 wherein said filler components are present as discrete finely divided particles uniformly blended in said composition.

5. A resin composition as defined in claim 3 wherein said filler components are included in composite particles comprising fused resin and filler components.

6. A resin composition as defined in claim 1 wherein the hardener is the reaction product of 2 mols of trimellitic anhydride and one mol of tetraethylene glycol.

7. A resin composition as defined in claim 1 wherein the hardener is the reaction product of 2 mols of trimellitic anhydride and one mol of triethylene glycol.

8. A resin composition as defined in claim 1 wherein the hardener is the reaction product of 2 mols of trimellitic anhydride and one mol of dipropylene glycol.

9. A resin composition as defined in claim 1 wherein the hardener is the reaction product of 2 mols of trimellitic anhydride and one mol of a mixed polyethylene glycol having an average molecular weight of about 200.

10. A resin composition as defined in claim 1 wherein the hardener is the reaction product of 2 mols of trimellitic anhydride and one mol of 1,6 hexane diol.

References Cited by the Examiner

UNITED STATES PATENTS

| | | |
|---|---|---|
| 2,947,717 | 8/1960 | Belanger et al. |
| 3,039,987 | 6/1962 | Elbling. |
| 3,065,186 | 11/1962 | Budnowski et al. |
| 3,159,595 | 12/1964 | Parry. |

MORRIS LIEBMAN, *Primary Examiner.*

ALEXANDER H. BRODMERKEL, *Examiner.*

J. W. BEHRINGER, J. E. CALLAGHAN,
*Assistant Examiners.*